United States Patent [19]

Iwasawa et al.

[11] Patent Number: 4,923,930
[45] Date of Patent: May 8, 1990

[54] CURABLE RESIN AND RESIN COMPOSITION CURABLE AT LOW TEMPERATURE

[75] Inventors: Naozumi Iwasawa, Hiratsuka; Osamu Isozaki, Yokohama, both of Japan

[73] Assignee: Kansai Paint Company, Limited, Amagasaki, Japan

[21] Appl. No.: 272,959

[22] Filed: Nov. 18, 1988

[30] Foreign Application Priority Data

Nov. 20, 1987 [JP] Japan .................................. 62-294499
Nov. 26, 1987 [JP] Japan .................................. 62-298761

[51] Int. Cl.$^5$ ................................................. C08F 8/00
[52] U.S. Cl. .................................. 525/168; 525/167.5; 525/165
[58] Field of Search ..................... 525/167.5, 168, 165

[56] References Cited

U.S. PATENT DOCUMENTS 2,964,483 12/1960 Johnson et al. ..................... 525/168
3,932,326 1/1976 Itoh et al. ............................. 525/165

*Primary Examiner*—Melvyn I. Marquis
*Attorney, Agent, or Firm*—Armstrong, Nikaido, Marmelstein, Kubovcik & Murray

[57] ABSTRACT

This invention provides a curable resin obtained by polymerizing at least one of an alkoxysiloxane-containing vinyl monomer and a polysiloxane macromonomer, with an oxirane-containing vinyl monomer in the presence of a polymerization initiator and a resin having in the molecule a carboxyl group and/or an alicyclic hydrocarbon ring having one or two hydrogen atoms bonded to at least one carbon atom forming the alicyclic hydrocarbon ring; and a resin composition curable at a low temperature comprising the curable resin as defined above and a chelate compound.

14 Claims, No Drawings

CURABLE RESIN AND RESIN COMPOSITION CURABLE AT LOW TEMPERATURE

The present invention relates to novel curable resins and compositions thereof, and more particularly to resins which are curable at low temperatures and compositions thereof.

For energy cost reductions, it has been highly desired to develop resin compositions which are curable at low temperatures.

Heretofore chiefly used as low-temperature curable resin compositions are two-package resin compositions such as polyol/isocyanate, epoxy/polyamine and like compositions. These two-package resin compositions are cumbersome to handle since the components of the composition are separately stored in two packages and mixed together immediately before use. Moreover, those comprising an isocyanate have the drawback of being highly toxic. Polymerizable unsaturated resin compositions of the single-package type are also known which are curable with active energy, for example; of ultraviolet rays or electron rays, but these compositions have the drawback of necessitating an irradiation device.

On the other hand, single-package resin compositions are known which are curable at low temperatures without using any irradiation device. Unexamined Japanese Patent Publication No. 67553/1985, for example, discloses a composition comprising aluminum chelate compound and a vinyl polymer containing an alkoxysilane compound such as γ-methacryloxypropyltrimethoxysilane.

However, the conventional composition disclosed has drawbacks. Since only the silanol group resulting from the hydrolysis of the alkoxysilane group serves as a crosslinking functional group, there arises a need to use a large quantity of water for curing. The hydrolysis produces large amounts of alcohol and like by-products, which impair the properties of the cured product. Further when to be cured only with the moisture in air, the composition is not readily curable since curing occurs at the surface first but does not proceed smoothly throughout the interior. The composition is therefore liable to shrinkage on curing. The composition further has poor adhesion to substrates, for example, of plastics, metals and ceramics owing to the formation of by-products during curing and to the difference between the surface and the interior in the degree of curing.

To overcome the above drawbacks, the vinyl polymer may be replaced by polyester or epoxy resin which itself exhibits good adhesion to substrates, but it is still difficult to provide a composition which is curable at a low temperature to give a coating having excellent adhesion.

Accordingly, an object of the present invention is to provide a resin having high curability at low temperatures and a single-package low-temperature curable resin composition comprising the resin.

Another object of the invention is to provide a resin which is curable without water or which is curable in the presence of a small amount of water.

Another object of the invention is to provide a single-package low-temperature curable resin composition which is capable of forming a thick coating free of shrinkage owing to a reduced difference between the surface of the coating and the interior thereof in the degree of curing and which is applicable to various substrates with high adhesion.

Another object of the invention is to provide a low-temperature curable resin composition having high storage stability although available in a single package.

These and other objects of the invention will be apparent from the following description.

The present invention provides a curable resin obtained by polymerizing at least one of an alkoxysiloxane-containing vinyl monomer (hereinafter sometimes referred to as the "monomer (a)") and a polysiloxane macromonomer (hereinafter sometimes referred to as the "monomer (b)") with an oxirane-containing vinyl monomer (hereinafter sometimes referred to as the "monomer (c)") in the presence of a polymerization initiator and a resin having in the molecule a carboxyl group and/or an alicyclic hydrocarbon ring having one or two hydrogen atoms bonded to at least one carbon atom forming the alicyclic hydrocarbon ring (hereinafter referred to as the "resin (A)").

Our research has revealed that the curable resin of the present invention has high curability at low temperatures, is easily curable at a low temperature of up to 120° C. and is curable without water or in the presence of only a very small amount of water, such as the moisture in air. We have further found that when the curable resin is admixed with a chelate compound serving as a curing agent, the composition obtained is not only excellent in storage stability but is also capable of forming a thick coating which is uniformly curable both internally and externally without shrinkage and which exhibits excellent adhesion to the substrate.

The resin (A) for use in the invention includes a resin (hereinafter referred to as the "resin (A-i)") having an alicyclic hydrocarbon ring having one or two hydrogen atoms bonded to at least one carbon atom forming the alicyclic hydrocarbon ring, a resin (hereinafter referred to as the "resin (A-ii)") having a carboxyl group serving as a functional group, and a resin (hereinafter referred to as the "resin (A-iii)") having both the above alicyclic hydrocarbon ring and carboxyl group.

The alicyclic hydrocarbon ring in the resin (A-i and A-iii) is not limited specifically insofar as it has the structure mentioned. For example, the ring may be composed of a small to large number of members, i.e. at least 3 or four carbon atoms (preferably 5-membered or 6-membered ring). The carbon ring has one or two hydrogen atoms bonded to at least one of the carbon atoms forming the ring, and has a saturated structure or one or two unsaturated bonds in the ring. The alicyclic hydrocarbon ring can be incorporated into the resin, preferably using the following compounds.

(1) Cyclohexanedicarboxylic acids and anhydrides thereof represented by the formula (I) or (II)

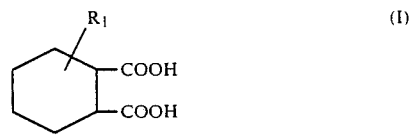

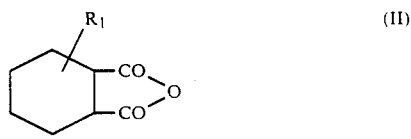

wherein $R_1$ is a hydrogen atom or alkyl having 1 to 6, preferably 1 to 3, carbon atoms. Examples thereof are

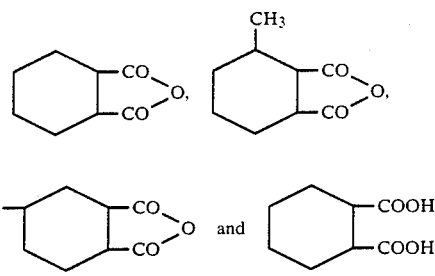

(2) Cyclohexenedicarboxylic acids and anhydrides thereof represented by one of the following formulae (III) to (VI)

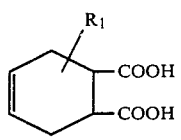  (III)

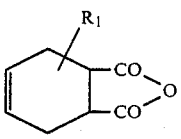  (IV)

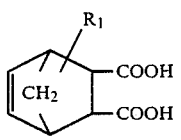  (V)

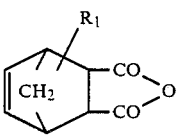  (VI)

wherein $R_1$ is as defined above. Examples thereof are

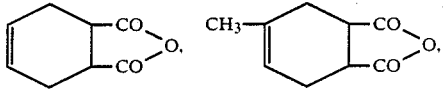

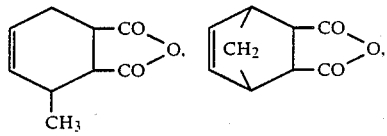

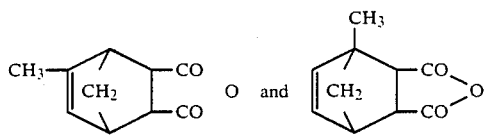

(3) Polyols represented by the formula (VII) or (VIII)

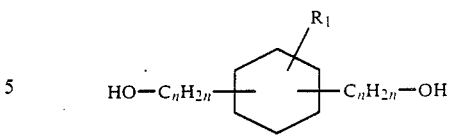 (VII)

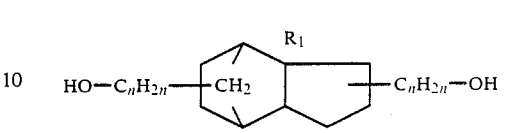 (VIII)

wherein $R_1$ is as defined above, and n is an integer of 1 to 6, such as

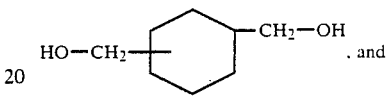, and

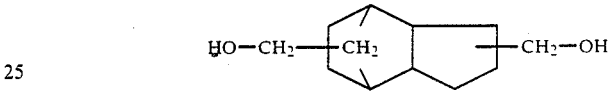

and polyols obtained by hydrogenating a polyhydric phenol compound (such as bisphenol A, bisphenol F or bisphenol B) represented by the formula

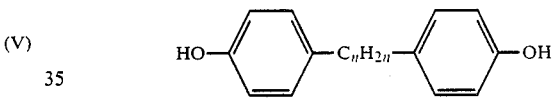

wherein n is as defined above.

(4) Epoxy compounds represented by one of the following formulae (IX) to (XI)

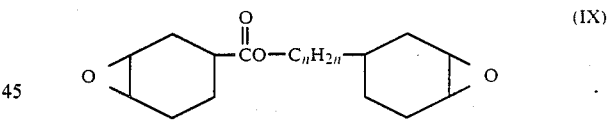 (IX)

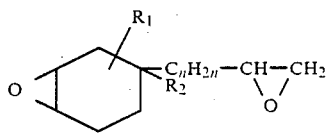 (X)

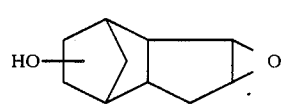 (XI)

and hydrogenated epoxy compounds prepared from an epoxy compound represented by the formula (XII)

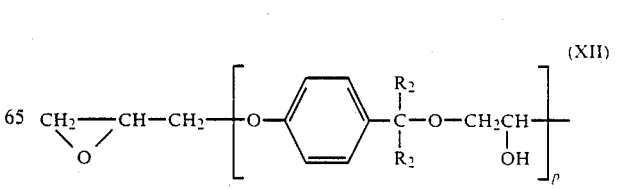 (XII)

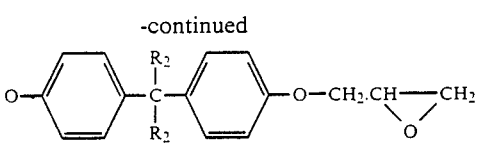

by hydrogenating some or all of the aromatic rings thereof. In the above formulae (IX) to (XII), $R_1$ and n are as defined above, $R_2$ is a hydrogen atom or methyl, and p is an integer of 0 to 16.

The alicyclic hydrocarbon ring can be introduced into resins with use of the above compounds by known processes for preparing synthetic resins. Examples of resins having the ring introduced therein are a polyester or alkyd resin prepared from the dicarboxylic acid or anhydride thereof of the above (1) or (2), for example, by reacting the compound (1) or (2) with a polyhydric alcohol, other polycarboxylic acid and, when required, a monohydric alcohol and/or mono-carboxylic acid, and a urethane- or caprolactone-modified product of the resulting polyester or alkyd resin; a polyester or alkyd resin obtained by reacting the polyol (3) or epoxy compound (4), or a modified product of the compound (4) (i.e. modified hydroxyl-containing ester obtained by reacting the epoxy group of the compound (4) with a carboxyl-containing compound), serving as an alcohol component, with a polycarboxylic acid, polyhydric alcohol and, when required, a monohydric alcohol and/or monocarboxylic acid, and a urethane- or caprolactone-modified product of the resulting polyester or alkyd resin; a resin obtained by reacting a resin having a functional group such as (anhydrous) carboxyl, isocyanate, hydroxyl or epoxy group with one of the compounds (1) to (4); etc. These resins or the combination of such resins to be used are not limitative; suitable resins can be selected from a wide variety of resins in accordance with the properties required.

The carboxyl-containing resin (A-ii) to be used in the curable resin of the invention can be one of known resins. Typical of such resins are polyester, urethanemodified polyester, epoxy-modified polyester, siliconemodified polyester, caprolactone-modified polyester, alkyd resin, epoxy-modified alkyd resin, phenol-modified alkyd resin, silicone-modified alkyd resin, urethane-modified alkyd resin, epoxy ester and the like which have a free carboxyl group.

When suitable starting materials exemplified above for use in preparing the resin (A-i) or (A-ii) are selected, the resin (A-iii) can be obtained which contains both an alicyclic hydrocarbon ring and carboxyl group.

It is desirable that the resin (A-i) contain at least about 0.1 mole of alicyclic hydrocarbon ring per kilogram of the resin. When containing a lesser amount of the ring, the resin has a reduced number of active sites when subjected to radical reaction with the monomers (a) to (c) to result in an adverse effect on the storage stability of the resulting curable resin solution and on the coating to be formed. More preferably, the resin contains at least about 0.3 but up to about 10 moles of alicyclic hydrocarbon ring per kilogram of the resin.

The carboxyl content of the resin (A-ii) is about 0.05 to about 1 mole per kilogram of the resin. Too small a carboxyl content produces an adverse effect on the storage stability of the curable resin solution to be obtained and on the properties of the coating to be formed. An excessive carboxyl content is likely to result in an increased viscosity or gelation during the radical polymerization reaction of the resin with the monomers (a) to (c). Preferably, the carboxyl content is about 0.1 to about 0.5 mole, more preferably about 0.1 to about 0.3 mole, per kilogram of the resin.

With the resin (A-iii) containing both the alicyclic hydrocarbon ring and carboxyl group, it is desired that the combined amount of the ring and the group per kilogram of the resin fulfill the following requirement.

$$0 \text{ mole} < X + Y < 11 \text{ moles}$$

wherein X is the mole number of alicyclic hydrocarbon ring per kilogram of the resin and is in the range of mole $< X <$ 10 moles, and Y is the mole number of carboxyl group per kilogram of the resin and is in the range of 0 mole $< Y <$ 1 mole. Preferably, $X + Y$ is in the range of 0.1 to 10 moles.

The curable resin of the invention can be obtained by polymerizing (i) at least one of the monomer (a) and the monomer (b) with (ii) the monomer (c) in the presence of the resin (A) and a polymerization initiator.

The curable resin of the invention includes a polymer of the resin (A) and the monomers (a) and (c), a polymer of the resin (A) and the monomers (b) and (c), or a polymer of the resin (A) and the monomers (a), (b) and (c). The curable resin of the invention may include in combination with the above polymer the unreacted resin (A) and/or copolymer of the monomers (a) to (c), i.e., a copolymer of the monomers (a) and (c), a polymer of the monomers (b) and (c) or a copolymer of the monomers (a), (b) and (c).

The alkoxysilane-containing vinyl monomer (a) is represented by the formula

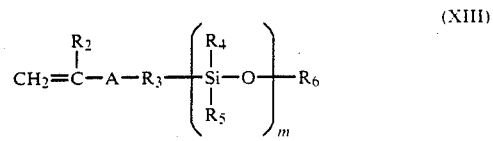

wherein A is

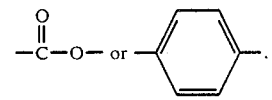

$R_2$ is a hydrogen atom or methyl, $R_3$ is a bivalent aliphatic saturated hydrocarbon group having 1 to 6 carbon atoms, $R_4$ and $R_5$ are the same or different and are each phenyl, alkyl having 1 to 6 carbon atoms or alkoxyl having 1 to 10 carbon atoms, $R_6$ is alkyl having 1 to 10 carbon atoms, and m is an integer of from 1 to 10.

With reference to the formula (XIII), the bivalent saturated aliphatic hydrocarbon group having 1 to 6 carbon atoms and represented by $R_3$ is a straight-chain or branched-chain alkylene group, such as methylene, ethylene, propylene, tetramethylene, ethylethylene, pentamethylene, hexamethylene or the like. The alkyl group represented by $R_4$, $R_5$ and $R_6$ and having 1 to 6 carbon atoms is a straight-chain or branched-chain alkyl group, such as methyl, ethyl, n-propyl, isopropyl, nbutyl, isobutyl, sec-butyl, tert-butyl, n-pentyl, isopentyl, neopentyl, n-hexyl, isohexyl or the like. The alkoxyl group represented by $R_4$ and $R_5$ and having 1 to 10 carbon atoms is a straight-chain or branched-chain alkoxyl group, such as methoxy, ethoxy, n-propoxy, isopropoxy, n-butoxy, isobutoxy, sec-butoxy, tert-butoxy, n-pentoxy, isopentoxy, n-hexyloxy, isohexyloxy, n-octyloxy or the like. When m in the formula (XIII) is at least 2, the groups R₄, as well as groups R₅· may be the same or different.

ysilane, γ-(meth)acryloxybutylphenyldipropoxysilane, γ-(meth)acryloxypropyldimethylmethoxysilane, γ-(meth)acryloxypropyldimethylethoxysilane, γ-(meth)acryloxypropylphenylmethylmethoxysilane, γ-(meth)acryloxypropylphenylmethylethoxysilane,

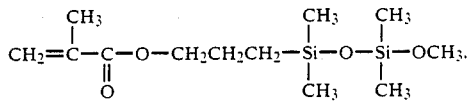

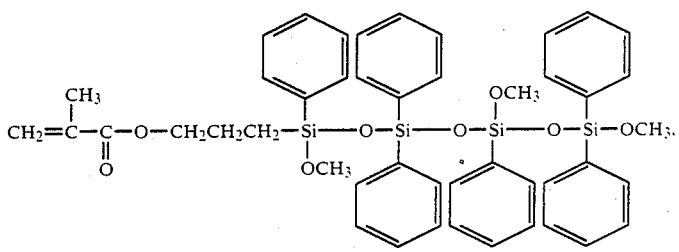

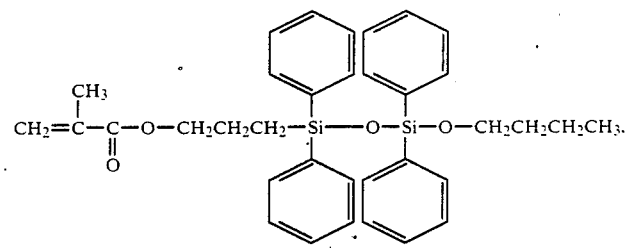

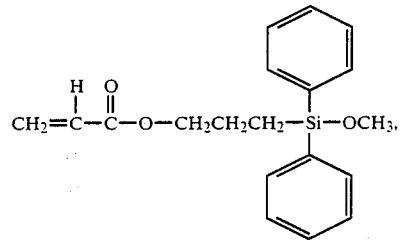

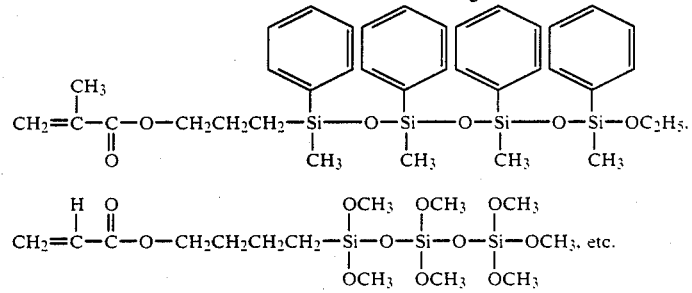

Of the compounds of the formula (XIII) for use in the invention, those wherein A is

are, for example, γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxybutylphenyldimethoxysilane, γ-(meth)acryloxybutylphenyldiethox- Further of compounds of the formula (XIII), those wherein A is

are, for example,

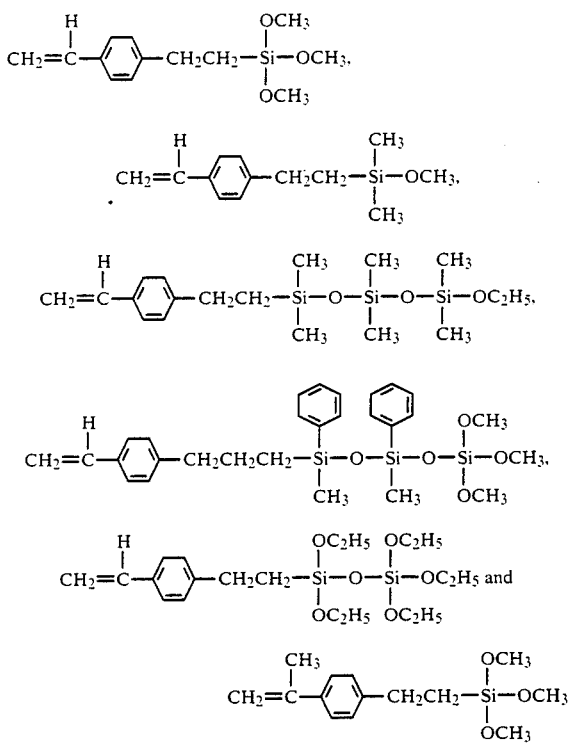

The polysiloxane macromonomer (b) has the main skeleton of siloxane bond having an aliphatic hydrocarbon group, phenyl, hydroxyl, alkoxyl, polymerizable unsaturated bond, etc. directly or indirectly attached to Si of the siloxane bond. Typically, the polysiloxane macromonomer is prepared by reacting 70 to 99.999 mole % of a compound (b¹) represented by the formula

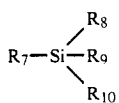   (XIV)

wherein $R_7$ is an aliphatic hydrocarbon group having 1 to 8 carbon atoms or phenyl, and $R_8$, $R_9$ and $R_{10}$ are each alkoxyl having 1 to 4 carbon atoms or hydroxyl with 30 to 0.001 mole % of a compound (b²) represented by the formula

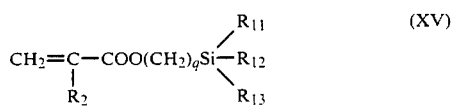   (XV)

wherein $R_2$ is a hydrogen atom or methyl, $R_{11}$, $R_{12}$ and $R_{13}$ are each hydroxyl, alkoxyl having 1 to 4 carbon atoms or an aliphatic hydrocarbon group having 1 to 8 carbon atoms, at least one of $R_{11}$, $R_{12}$ and $R_{13}$ being hydroxyl or alkoxyl, and q is an integer of 1 to 6, the macromonomer having one polymerizable unsaturated bond and at least two hydroxyl groups and/or alkoxyl groups at a portion thereof corresponding to the terminal end per molecule on the average, the macromonomer being 400 to 100000 in number average molecular weight.

In the compound (b¹), examples of alkoxyl groups having 1 to 4 carbon atoms are straight-chain or branched groups such as methoxy, ethoxy, propoxy, butoxy and the like. Examples of aliphatic hydrocarbon groups having 1 to 8 carbon atoms are methyl, ethyl, propyl, butyl, pentyl, hexyl, heptyl, octyl and the like which are straight-chain or branched groups.

Methyl and phenyl are especially desirable as $R_7$ in the compound (b¹). Preferable as $R_8$, $R_9$ and $R_{10}$ are methoxy, ethoxy, propoxy, butoxy and hydroxyl. Examples of preferred compounds (b¹) are methyltrimethoxysilane, phenyltrimethoxysilane, butyltrimethoxysilane, methyltriethoxysilane, methyltributoxysilane, phenyltrisilanol, methyltrisilanol and the like, among which methyltrimethoxysilane, phenyltrimethoxysilane and phenyltrisilanol are especially desirable. These compounds (b¹) can be used singly or in combination.

In the above compound (b²), $R_2$ represents a hydrogen atom or methyl, and $R_{11}$, $R_{12}$ and $R_{13}$ are each hydroxyl, alkoxyl having 1 to 4 carbon atoms or an aliphatic hydrocarbon group having 1 to 8 carbon atoms. q is an integer of 1 to 6. $R_{11}$, $R_{12}$ and $R_{13}$ may all be the same or different, or at least one of them may be different from the others. However, at least one of them is hydroxyl or alkoxyl.

In the compound (b²), examples of aliphatic hydrocarbon groups having 1 to 8 carbon atoms, as well as alkoxyl groups having 1 to 4 carbon atoms, can be those exemplified for the compound (b¹). Methoxy, ethoxy and hydroxyl groups are especially desirable as $R_{11}$, $R_{12}$ and $R_{13}$, and q is preferably in the range of from 2 to 4. Examples of preferable compounds (b²) are γ-methacryloxypropyltrimethoxysilane, γ-methacryloxypropyltriethoxysilane, γ-acryloxypropyltrimethoxysilane, γ-methacryloxybutyltriethoxysilane, γ-acryloxypropyltrisilanol and the like. More preferable among these examples are γ-methacryloxypropyltrimethoxysilane, γ-methacryloxypropyltriethoxysilane and γ-acryloxypropyltrisilanol. These compounds (b²) can be used singly or in combination.

According to the present invention, the polysiloxane macromonomer can be prepared by reacting the compound (b¹) with the compound (b²). The proportions of the two compounds, based on the combined amount thereof, are about 70 to about 99.999 mole %, preferably about 90 to about 99.9 mole %, more preferably about 95 to about 99 mole %, of the compound (b¹), and about 30 to about 0.001 mole %, preferably about 10 to about 0.1 mole %, more preferably about 5 to about 1 mole %, of the compound (b²). If the amount of the compound (b¹) is less than 70 mole %, the mixture is liable to gel during the copolymerization reaction, whereas if it is larger than 99.999 mole %, the amount of uncopolymerized polysiloxane increases to render the resin solution turbid, hence undesirable.

The reaction between the compounds (b¹) and (b²) is effected by the dehydration condensation of the hydroxyl groups contained in these compounds and the hydroxyl groups resulting from the hydrolysis of the alkoxyl groups of the compounds. Depending on the reaction conditions, the reaction involves dealcoholization condensation in addition to the dehydration reaction.

Although the reaction can be carried out in the absence of solvent, it is desirable to conduct the reaction in water or an organic solvent wherein both the compounds (b¹) and (b²) are soluble. Examples of desirable organic solvents are hydrocarbon solvents such as heptane, toluene, xylene, octane and mineral spirit, ester solvents such as ethyl acetate, n-butyl acetate, isobutyl acetate, methyl cellosolve acetate and butylcarbitol acetate, ketone solvents such as methyl ethyl ketone, methyl isobutyl ketone and diisobutyl ketone, alcoholic solvents such as ethanol, isopropanol, n-butanol, sec-butanol and isobutanol, ether solvents such as n-butyl ether, dioxane, ethylene glycol monomethyl ether and ethylene glycol monoethyl ether, and the like. These solvents are usable singly or in combination.

When the compounds (b¹) and (b²) are used in the form of a solution, the combined concentration of these compounds in the solution is suitably at least about 5 wt. %.

According to the invention, the compounds (b¹) and (b²) are reacted suitably at a temperature of about 20° to about 180° C., preferably about 50° to about 120° C. The reaction time is suitably about 1 to about 40 hours usually.

When required, the reaction may be carried out in the presence of a polymerization inhibitor, which is effective for preventing the polymerization reaction due to unsaturated bonds in the compound (b²). Examples of useful inhibitors are hydroquinone, hydroquinone monomethyl ether and like quinone compounds.

The reaction system of compounds (b¹) and (b²) for preparing the polysiloxane macromonomer may have incorporated therein tetraalkoxysilane, dialkyldialkoxysilane or the like, which can be used in an amount of up to about 20 mole % based on the combined amount of the compounds (b¹) and (b²).

When $R_8$, $R_9$, $R_{10}$, $R_{11}$, $R_{12}$ and $R_{13}$ in the compounds (b¹) and (b²) are all hydroxyl, it is desirable to conduct the reaction in an organic solvent with heating and stirring for dehydration condensation.

Further when at least one of the compounds (b¹) and (b²) has alkoxyl attached to Si, it is desired to effect hydrolysis before condensation. The hydrolysis reaction and the condensation reaction can be carried out continuously in the presence of water and a catalyst with heating and stirring. The amount of water to be used for these reactions, although not limited specifically, is preferably at least about 0.1 mole per mole of alkoxyl. With less than about 0.1 mole of water present, the two compounds are likely to become lower in reactivity. It is most preferable to use a large excess of water. In the case where the condensation reaction produces an alcohol which is sparingly soluble in water, the use of water and a water-soluble organic solvent in combination serves to render the reaction system uniform. Desirable for use as water-soluble organic solvents are the aforementioned alcoholic, ester, ether and ketone solvents. Acid or alkali catalysts are usable as catalysts for the hydrolysis reaction. Examples of useful acid catalysts are hydrochloric acid, sulfuric acid, phosphoric acid, formic acid, acetic acid, propionic acid, acrylic acid, methacrylic acid and the like. Examples of useful alkali catalysts are sodium hydroxide, triethylamine, ammonia and the like. It is suitable to use the catalyst in an amount of about 0.0001 to about 5 wt. %, preferably about 0.01 to about 0.1 wt. %, based on the combined amount of the compounds (b¹) and (b²).

The polysiloxane macromonomer to be used in this invention is about 400 to about 100000, preferably about 1,000 to about 20,000, in number average molecular weight. If this value is less than about 400, the copolymerization reaction system tends to gel, whereas values exceeding about 100000 is likely to result in impaired compatibility, hence undesirable.

The main skeleton of the polysiloxane macromonomer afforded by the reaction of the compounds (b¹) and (b²) in the present invention comprises a siloxane bond. The main skeleton primarily has a linear structure, ladder structure or a structure in the form of a combination of these structures. It is desirable to use a macromonomer of ladder structure, or a macromonomer of combination structure having a larger proportion of ladder structure, from the viewpoint of resistance to water, heat and light. The structure of the macromonomer can be selectively determined as desired according to the ratio between the compound (b¹) and the compound (b²), the amounts of water and acid catalyst, etc. The polysiloxane macromonomer has a structure wherein the Si of the siloxane bond has attached thereto groups such as $R_7$ or $R_8$ to $R_{10}$ of the formula (XIV), and

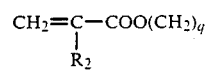

or $R_{11}$ to $R_{13}$. The macromonomer has as attached to the Si at least two free functions groups per molecule, such as hydroxyl and alkoxyl having 1 to 4 carbon atoms (i.e., silanol and/or alkoxysilane).

It is further desired that the polysiloxane macromonomer have on the average about 0.2 to about 1.9, preferably about 0.6 to about 1.4, more preferably about 0.9 to about 1.2, polymerizable unsaturated bonds per molecule. With a very small quantity of polymerizable unsaturated bonds present, the copolymerization reaction product is liable to become turbid, whereas when having an excess of such bonds, the macromonomer is likely to gel during the reaction, hence undesirable.

The oxirane-containing vinyl monomer (c) is another essential monomer component of the present resin. Preferred examples of such monomers are those represented by the following formulae.

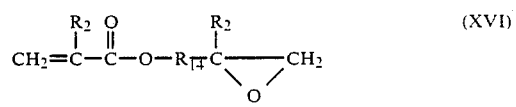 (XVI)

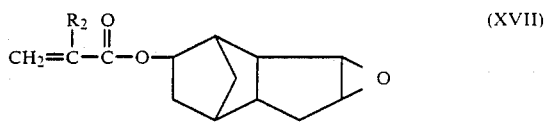 (XVII)

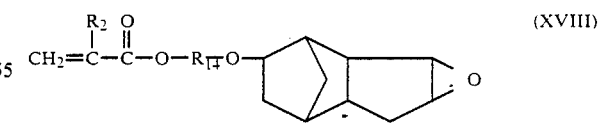 (XVIII)

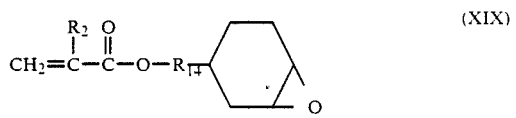 (XIX)

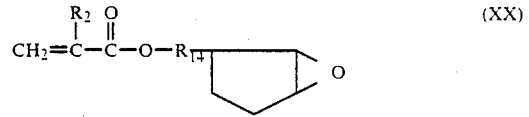 (XX)

-continued

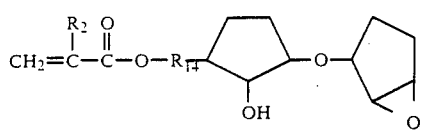 (XXI)

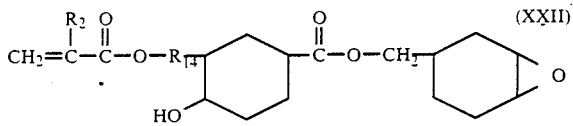 (XXII)

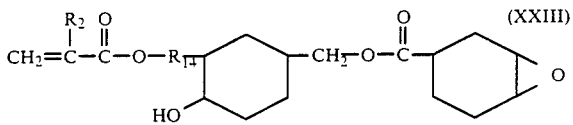 (XXIII)

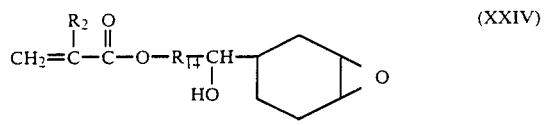 (XXIV)

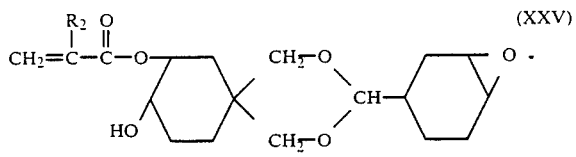 (XXV)

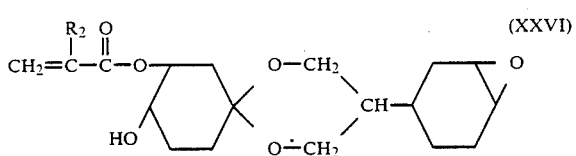 (XXVI)

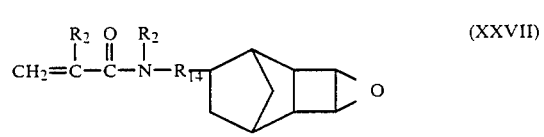 (XXVII)

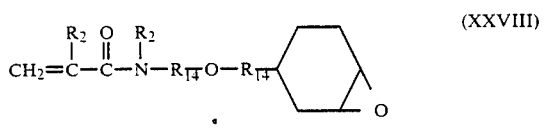 (XXVIII)

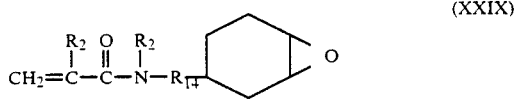 (XXIX)

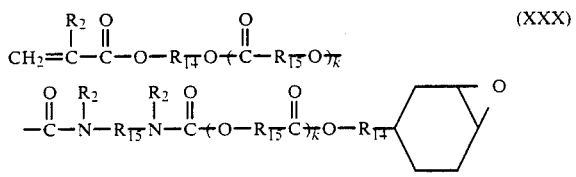 (XXX)

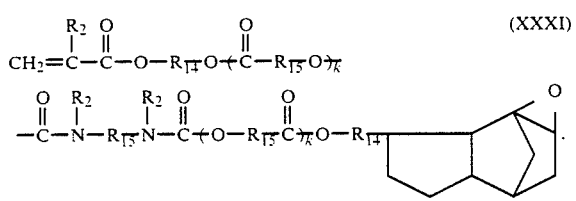 (XXXI)

In the above formulae, $R_2$ is a hydrogen atom or methyl and the $R_2$ groups are the same or different, $R_{14}$ is a bivalent aliphatic saturated hydrocarbon group having 1 to 6 carbon atoms and the $R_{14}$ groups are the same or different, $R_{15}$ is a bivalent hydrocarbon group having 1 to 10 carbon atoms and the $R_{15}$ groups are the same or different, and K is an integer of from 0 to 10.

Examples of bivalent aliphatic saturated hydrocarbon groups $R_{14}$ having 1 to 6 carbons are straight-chain or branched-chain alkylene groups such as methylene, ethylene, propylene, tetramethylene, ethylethylene, pentamethylene and hexamethylene. Examples of bivalent hydrocarbon groups $R_{15}$ having 1 to 10 carbon atoms are methylene, ethylene, propylene, tetramethylene, ethylethylene, pentamethylene, hexamethylene, polymethylene, phenylene,

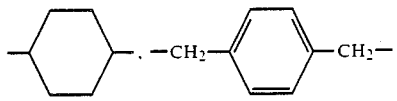

and the like.

It is especially desirable to use a vinyl monomer having an alicyclic epoxy group from the viewpoint of curability. Use of such a monomer results in the advantage of expedited curing and giving improved properties to the coating on curing since the epoxy group is highly reactive in ring-opening polymerization reaction.

In polymerizing at least one of the monomers (a) and (b) with the monomer (c) in the presence of the resin (A) and a polymerization initiator, an $\alpha,\beta$-ethylenically unsaturated monomer is usable. The monomer to be used can be selected from among a wide variety of such unsaturated monomers according to the properties desired. Typical examples of such unsaturated monomers are as follows.

(I) Esters of Acrylic Acid or Methacrylic Acid $C_1$ to $C_{18}$ alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_2$ to $C_{18}$ alkoxyalkyl esters of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; $C_2$ to $C_8$ alkenyl esters of acrylic acid or methacrylic acid such as allyl acrylate and allyl methacrylate; $C_2$ to $C_8$ hydroxyalkyl esters of acrylic acid or methacrylic acid such as hydroxyethyl acrylate, hydroxyethyl methacrylate, hydroxypropyl acrylate and hydroxypropyl methacrylate; addition products of the above hydroxyalkyl esters of acrylic acid or methacrylic acid with polycaprolactone; and $C_3$ to $C_{18}$ alkenyloxyalkyl esters of acrylic acid or methacrylic acid such as allyloxyethyl acrylate and allyloxyethyl methacrylate.

(II) Vinyl Aromatic Compounds

Styrene, α-methylstyrene, vinyltoluene and p-chlorostyrene.

(III) Polyolefinic Compounds

Butadiene, isoprene and chloroprene.

(IV) Others

Acrylonitrile, methacrylonitrile, methyl isopropenyl ketone, vinyl acetate, Veova monomer (product of Shell Chemical), vinyl propionate, vinyl pivalate, etc.

The proportions of the monomers (a) and/or (b), and (c) and other unsaturated monomer are 0.1 to 75 wt. % of the monomer (a) and/or the monomer (b), 1.0 to 75 wt. % of the monomer (c), and 0 to 98.9 wt. % of other unsaturated monomer, calculated as solids, based on the combined amount of the monomers, in view of the curability, finish, etc. When the proportion of the monomer (a) and/or the monomer (b) is less than 0.1 wt. %, the applied composition exhibits lower curability to render the coating lower in hardness and adhesion. If the proportion is in excess of 75 wt. %, the resulting coating exhibits lower mechanical properties, shrinks and has a poor finish. When the proportion of the monomer (c) is smaller than 1.0 wt. %, the applied composition exhibits lower curability, whereas when more than 75 wt. % of the monomer (c) is present, the coating obtained is lower in adhesion and water resistance.

When at least one of the monomers (a) and (b), the monomer (c) and, when required, other monomer are subjected to radical polymerization in the presence of the resin (A), a polymerization initiator is used. Examples of useful initiators are those usable for radical polymerization, such as azo compounds, percarbonate compounds, peroxide compounds, diazo compounds, nitroso compounds, redox compounds and ionizable radiation. To assure high storage stability, excellent finish and good adhesion, it is suitable to use, among these, peroxide compounds such as benzoyl peroxide, lauryl peroxide, tertbutyl octoate, cumene hydroperoxide, p-tert-butyl peroxide and like, and percarbonate compounds.

The method of preparing the curable resin of the invention is not limited specifically. For example, the resin can be prepared by admixing at least one of the monomers (a) and (b), the monomer (c) and, when desired, other monomer (these monomers may sometimes be referred to as a "monomer mixture"), and the polymerization initiator with the resin (A) or a solution thereof, and polymerizing the mixture by heating; adding the monomer mixture and the initiator dropwise to the resin (A) or solution thereof as heated; admixing a portion of the monomer mixture and a portion of the initiator with the resin (A) or solution thereof, heating the resulting mixture (usually for 30 minutes to 3 hours) for polymerization, and thereafter adding the remaining portions of the monomer mixture and the initiator dropwise to the reaction mixture for further polymerization; or adding the resin (A) or solution thereof, the monomer mixture and the initiator dropwise to a heated solvent. The heating temperature is usually 70° to 150° C., preferably 90° to 130° C.

Similarly usable as the curable resin of the invention is a mixture of two resins, i.e. a resin obtained by polymerizing at least one of the monomers (a) and (b) and, when required, other monomer, in the presence of the resin (A) and a polymerization initiator, and another resin obtained by polymerizing the monomer (c) and, when required, other monomer, in the presence of the resin (A) and a polymerization initiator.

The solution of the resin (A) is prepared using an organic solvent which dissolves or disperses the resin (A) and which is inert to the reaction system.

The solvent, when remaining in the coating after drying, is likely to adversely affect the hardness, durability, etc. thereof, so that it is desirable to use an organic solvent having a boiling point of up to 150° C., such as an aromatic, aliphatic hydrocarbon, ketone, alcohol or ester solvent. The organic solvent can be present in an amount of about 10 to about 150 parts by weight per 100 parts by weight of the curable resin.

The proportions of the resin (A) and the monomer mixture are 95 to 20 wt. %, preferably 80 to 30 wt. %, of the resin (A), and 5 to 80 wt. %, preferably 20 to 70 wt. %, of the monomer mixture, calculated as solids. When the proportion of the resin (A) is more than 95 wt. % (with less than 5 wt. % of the monomer mixture present), reduced curability will result, whereas if the proportion of the resin (A) is less than 20 wt. % (with more than 80 wt. % of the monomer mixture present), the resin has impaired adhesion to various substrates.

The curable composition of the invention comprises as a crosslinking curing agent at least one of aluminum chelate compounds, titanium chelate compounds, zirconium chelate compounds and like chelate compounds. Of these chelate compounds, more preferably are those containing a compound capable of forming a keto-enol tautomer, as ligands forming a stable chelate ring.

Examples of useful compounds capable of forming a keto-enol tautomer are β-diketones (such as acetylacetone), acetoacetic acid esters (such as methyl acetoacetate), malonic esters (such as ethyl malonate), ketones having hydroxyl in the β-position (such as diacetone alcohol), aldehydes having hydroxyl in the β-position (such as salicylaldehyde), esters having hydroxyl in the β-position (such as methyl salicylate), etc. Especially preferred results can be achieved when acetoacetates and β-diketones are used.

The aluminum chelate compound can be prepared advantageously, for example, by admixing the compound capable of forming a keto-enol tautomer with an aluminum alcoholate represented by the formula

(XXXII)

wherein $R_{16}$ is an alkyl having 1 to 20 carbon atoms or alkenyl and the $R_{16}$ groups are the same or different, usually in the ratio of up to about 3 moles of the former per mole of the latter, and heating the mixture when required.

Examples of alkyl groups having 1 to 20 carbon atoms are methyl, ethyl, propyl, butyl, pentyl, hexyl, heptyl, octyl, nonyl, decyl, undecyl, dodecyl, tridecyl, tetradecyl, octadecyl and the like. Examples of alkenyl groups are vinyl, allyl and the like.

Examples of aluminum alcoholates represented by the formula (XXXII) are aluminum trimethoxide, aluminum triethoxide, aluminum tri-n-propoxide, aluminum triisopropoxide, aluminum tri-n-butoxide, aluminum triisobutoxide, aluminum tri-sec-butoxide, aluminum tritert-butoxide, etc. It is especially desirable to use aluminum triisopropoxide, aluminum tri-sec-butoxide and aluminum tri-n-butoxide.

The titanium chelate compound can be prepared advantageously, for example, by admixing the compound capable of forming a keto-enol tautomer with a titanate represented by the formula

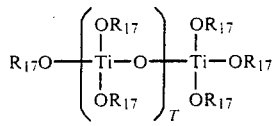

(XXXIII)

wherein T is an integer of 0 to 10, and $R_{17}$ is alkyl having 1 to 20 carbon atoms or alkenyl and the $R_{17}$ groups are the same or different, usually in the ratio of up to about 4 moles of the former per mole of the Ti in the titanate, followed by heating when required. Examples of alkyl groups having 1 to 20 carbon atoms and alkenyl groups are the same as those given above.

Examples of titanates represented by the formula (XXXIII) wherein T is 0 are tetramethyl titanate, tetraethyl titanate, tetra-n-propyl titanate, tetraisopropyl titanate, tetra-n-butyl titanate, tetraisobutyl titanate, tetra-tert-butyl titanate, tetra-n-pentyl titanate, tetra-n-hexyl titanate, tetraisooctyl titanate, tetra-n-lauryl titanate and the like. Favorable results can be obtained by using tetraisopropyl titanate, tetra-n-butyl titanate, tetraisobutyl titanate and tetra-tertbutyl titanate. Of the titanates wherein T is 1 or greater, the dimers to hendecamers (T=1 to 10 in the formula (XXXIII)) of tetraisopropyl titanate, tetra-n-butyl titanate, tetraisobutyl titanate and tetra-tertbutyl titanate achieve good results.

The zirconium chelate compound can be prepared favorably, for example, by admixing the compound capable of forming a keto-enol tautomer with a zirconate represented by the formula

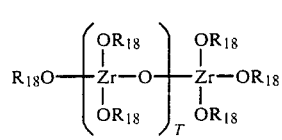

(XXXIV)

wherein T is an integer of 0 to 10, and $R_{18}$ is alkyl having 1 to 20 carbon atoms or alkenyl and the $R_{18}$ groups are the same or different, usually in the ratio of up to about 4 moles of the former per mole of the Zr in the zirconate, followed by heating when required. Examples of alkyl groups with 1 to 20 carbon atoms and alkenyl groups are the same as those exemplified above.

Examples of zirconates represented by the formula (XXXIV) are tetraethyl zirconate, tetra-n-propyl zirconate, tetraisopropyl zirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate and the like. Especially good result can be obtained with use of tetraisopropyl zirconate, tetra-n-propyl zirconate, tetraisobutyl zirconate, tetra-n-butyl zirconate, tetra-sec-butyl zirconate and tetra-tert-butyl zirconate. Of the zirconates wherein T is 1 or greater, the dimers to hendecamers (T=1 to 10 in the formula (XXXIV) of tetraisopropyl zirconate, tetra-n-propyl zirconate, tetra-n-butyl zirconate, tetraisobutyl zirconate, tetra-sec-butyl zirconate and tetra-tert-butyl zirconate give good results. The chelate compound may contain structural units wherein such zirconates are associated with each other.

Examples of especially preferred chelate compounds for use in the invention are aluminum chelate compounds such as diisopropoxy ethylacetoacetate aluminum, tris(ethylacetoacetate)aluminum, tris(n-propylacetoacetate)aluminum, tris(isopropylacetoacetate)aluminum, tris(n-butylacetoacetate)aluminum, isopropoxy bis(ethylacetoacetate)aluminum, isopropoxy bis(propionylacetonato)aluminum, tris(acetylacetonato)aluminum, tris(propylacetoacetate)aluminum, tris(propionylacetonato)aluminum, acetylacetonato-bis(ethylacetoacetate)aluminum, ethylacetoacetate bis(acetylacetonato)aluminum, tris(isopropionylacetonato)aluminum, tris(sec-butyrylacetonato)aluminum, [bis(isopropionylacetonato) sec-butyrylacetonato]aluminum and tris(butylacetoacetate)aluminum; titanium chelate compounds such as diisopropoxy-bis(ethylacetoacetate)titanate, diisopropoxy-bis(acetylacetonato)titanate and isopropoxytris(propionylacetonato)titanate; and zirconium chelate compounds such as tetrakis(acetylacetonato)zirconium, tetrakis(n-propylacetoacetate)zirconium, tetrakis(propionylacetonato)zirconium and tetrakis(ethylacetoacetate)zirconium.

According to the present invention, the aluminum chelate compounds, zirconium chelate compounds and titanium chelate compounds may be used singly or in a suitable combination of at least two of them as a crosslinking agent. It is suitable to use the chelate compound in an amount of about 0.01 to about 30 parts by weight per 100 parts by weight of the combined amount of the solids of the curable resin. Amounts outside this range is not desirable; smaller amounts tend to result in lower crosslinking curability, whereas when used in larger amounts, the chelate compound remains in the cured product and tends to result in lower water resistance. The amount is preferably about 0.1 to about 10 parts by weight, more preferably about 1 to about 5 parts by weight.

When required, extender pigments, coloring pigments, dyes, etc. can be incorporated into the curable composition of the invention. Further when required, it is also possible to incorporated into the composition monofunctional or polyfunctional epoxy compounds, low-molecular-weight silane compounds such as triphenylmethoxysilane and diphenyldimethoxysilane, conventional alkoxysilane-containing silicone resins, etc.

Further to give improved storage stability, it is possible to added to the composition compounds providing ligands for the chelate compound, such as the aforementioned compounds capable of forming a keto-enol tautomer.

The method of applying the present resin composition is not limited specifically but can be any of usual coating methods such as spray coating, roll coating and brush coating.

The resin composition of the present invention, is readily curable through crosslinking at low temperatures of up to about 120° C. For example, the composition can be fully cured at room temperature without any heating usually in about 8 hours to about 7 days. When heated at about 40° to about 100° C., the composition can be completely cured in about 5 minutes to about 3 hours.

The curing reaction of the present composition starts with the evaporation of the solvent and is thought to proceed in the fashion of a chain reaction by virtue of the vaporization of the chelating agent from the crosslinking agent. Presumably, the crosslinking agent causes the reaction to proceed through the following mechanism. For example, when the crosslinking curing agent used is an aluminum chelate compound, the vaporization of the chelating agent is followed by the reaction of the aluminum compound with the silanol group produced by the hydrolysis of the alkoxyl group in the alkoxysiloxane-containing vinyl monomer or with the silanol group derived from the polysiloxane macromonomer to produce the bond

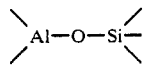

in the first stage.

Subsequently in the second stage, a coordination bond is formed between silanol and

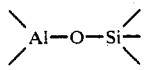

in the form of

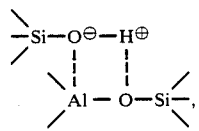

whereby the silanol is polarized. The polarized silanol reacts with an oxirane group, forming an oxonium salt as represented by

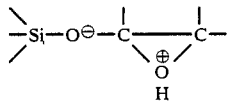

Subsequently, the ionic polymerization of oxirane groups and the addition reaction thereof with hydroxyl groups occur.

It appears that the composition of the invention cures through the crosslinking reaction catalytically effected by the crosslinking curing agent as stated above, and also through various reaction, such as condensation reaction between silanol groups, which occur concurrently with the crosslinking reaction. Presumably, the following curing reactions take place.
(A) Condensation of silanol groups.
(B) Condensation of silanol groups with hydroxyl groups from oxirane groups.
(C) Addition of silanol groups to oxirane groups.
(D) Addition of hydroxyl groups to oxirane groups.
(E) Ion polymerization of oxirane groups.

When the polysiloxane macromonomer in the present composition contains alkoxyl groups (i.e. alkoxysilane group) as a functional group, the silanol group is produced, which therefore requires hydrolysis. However, this hydrolysis reaction fully proceeds in the presence of a very small amount of water, such as the moisture of air.

With the present composition, the vinyl copolymer used contain silanol groups produced by the hydrolysis of the alkoxysiloxane-containing vinyl monomer which is a monomer component thereof, or silanol groups or like functional groups derived from the polysiloxane macromonomer, and oxirane groups derived from the oxirane-containing vinyl monomer. Accordingly, various curing reactions, such as the reactions (A) to (E) given above occur concurrently. Consequently, curing proceeds at the same time at the surface of the applied composition and in the interior thereof. This reduces the difference in the degree of curing at the surface and the interior, rendering the composition less prone to shrinkage upon curing.

The composition of the invention comprises a curable resin which is obtained by polymerizing monomers in the presence of the resin (A) having carboxyl group and/or an alicyclic hydrocarbon ring having one or two hydrogen atoms bonded to at least one carbon atom forming the alicyclic hydrocarbon ring, and the resin (A) is highly compatible with the copolymer, so that the composition is excellent in storage stability, finish, etc. Further the resin (A) can be selected from among a wide variety of resins (such as epoxy resin) which are less compatible with copolymers, in accordance with the desired properties (especially adhesion).

The cured product of the present composition has high resistance to weather, water, etc. For example, the composition is suited for use in coating or repairing motor vehicles and containers, in coating outdoor building materials and in preparing precoated metals (PCMs), etc.

The resin composition of the invention has the outstanding features given below.

(1) The composition can be readily cured by crosslinking at low temperatures of up to 120° C. For example, when cured at 80° C. for 30 minutes, the composition gives a cured product having a gel fraction of at least 95%.

(2) The curing reaction requires no water or proceeds in the presence of a small quantity of water, e.g. the moisture in air.

(3) The composition starts curing with the vaporiation of the solvent, so that the composition, when prepared as a single-package composition, can be stored with good stability.

(4) The composition is free from any curing agent, such as isocyanate, which is highly toxic.

(5) The condensation reaction of silanol groups, the ion polymerization reaction of epoxy groups and other curing reactions occur concurrently, consequently diminishing the difference in the degree of curing between the surface and the interior, causing no shrinkage and rendering the composition satisfactorily usable for producing coatings of increased thickness.

(6) The composition affords cured products which are excellent in properties, especially in resistance to weather and water and impact because of reduced amounts of alcohol and other by-products.

(7) The composition has little or no likelihood of remaining uncured in the surface layer when cured, is excellent in overcoatability and recoatability and provides cured products which are outstanding in adhesion, (8) The composition comprises a curable resin composed of two components which are different in properties, i.e. the resin (A) and the copolymer, so that the composition exhibits excellent adhesion to the substrate to which the copolymer fails to exhibit good adhesion when singly used.

The present invention will be described with reference to the following examples, in which the parts and percentages are by weight.

Preparation of resin (A-1)

| | |
|---|---|
| [cyclohexene dicarboxylic anhydride structure] | 121.6 parts |
| Trimethylolpropane | 26.8 parts |
| Neopentyl glycol | 83.2 parts |

The above mixture was placed into a reactor and subjected to dehydration condensation reaction at 220° C. to obtain a polyester resin (A-1) (cyclohexane ring 3.7 moles/kg) having an acid value of 2.0 and a Gardner viscosity of R (60% solids, 2-butoxyethanol solution, 25° C.).

Preparation of resin (A-2)

| | |
|---|---|
| Hexahydrophthalic anhydride | 23.1 parts |
| Isophthalic acid | 107.9 parts |
| Trimethylolethane | 12.0 parts |
| Neopentyl glycol | 93.6 parts |

The above mixture was placed into a reactor and subjected to dehydration condensation reaction at 230° C. to obtain a polyester resin (A-2) (cyclohexane ring 0.7 mole/kg) having an acid value of 1.5 and a Gardner viscosity of S (70% solids, methyl isobutyl ketone, 25° C.).

Preparation of resin (A-3)

| | |
|---|---|
| [bisphenol A structure HO–C6H4–C(CH3)2–C6H4–OH] | 48 parts |
| "Placcel 205" (brand name, product of Daicel Ltd., Japan) | 440 parts |

The above mixture was placed into a reactor and dissolved in 627 parts of butyl acetate. The solution was heated to 40° C., and 139.2 parts of tolylene diisocyanate was added dropwise to the solution over a period of 2 hours. The mixture was then maintained at the same temperature for one hour and thereafter heated at 80° C. for continued reaction until infrared spectroscopic analysis no longer revealed absorption of any isocyanate group, giving a urethane resin (A-3) (cyclohexane ring 0.6 mole/kg (solids)) which was 50% in solids content.

Preparation of resin (A-4)

| | |
|---|---|
| [diglycidyl ether of bisphenol structure with epoxy end groups] | 352 parts |
| [bisphenol structure HO–C6H4–C(CH3)2–C6H4–OH] | 114 parts |

The above mixture was placed into a reactor and reacted at 160° C. for 5 hours in the presence of 0.04 part of tributylamine serving as a catalyst to give an epoxy resin. Subsequently, 46.6 parts of the epoxy resin, 315 parts of "Epon 828" (brand name of epoxy resin, product of Shell Petrochemical Co., Ltd.) and 173.8 parts of 2-ethylhexanoic acid were reacted at 180° C. to obtain an epoxy ester (cyclohexane ring 0.37 moles/kg) having an acid value of 0.2.

Preparation of resin (A-5)

| | |
|---|---|
| Dimethyl terephthalate | 155.2 parts |
| Trimethylolpropane | 26.8 parts |
| Neopentyl glycol | 83.2 parts |

The above mixture was placed into a reactor and reacted at 220° C. for 5 hours in the presence of 1.0 part of dibutyltin dioxide serving as a catalyst, giving a polyester resin (A-5) having an acid value of 0.1.

Preparation of resin (A-6)

| | |
|---|---|
| Phthalic anhydride | 125.8 parts |
| Trimethylolpropane | 26.8 parts |
| Neopentyl glycol | 83.2 parts |

The above mixture was placed into a reactor and subjected to dehydration condensation reaction at 220° C. for 8 hours to obtain a polyester resin (carboxyl group 0.21 mole/kg) having an acid value of 12.0.

Preparation of resin (A-7)

| | |
|---|---|
| [bisphenol A structure HO–C6H4–C(CH3)2–C6H4–OH] | 48 parts |
| "Placcel 205" (brand name, product of Daicel Ltd., Japan) | 440 parts |

The above mixture was dissolved in 665.6 parts of butyl acetate, and 177.6 parts of isophorone diisocyanate was added dropwise to the solution (60° C.) over a period of 2 hours. The mixture was then maintained for 1 hour and thereafter heated at 80° C. for 4 hours for continued reaction until infrared spectroscopic analysis revealed no absorption of isocyanate group. Subsequently, 7.4 parts of phthalic anhydride was added to the reaction mixture, and the resulting mixture was reacted at 140° C. for 1.5 hours, giving a urethane-modified polyester resin (carboxyl group 0.074 mole/kg) having an acid value of 4.2.

Preparation of resin (A-8)

| "Epon 1001" (brand name, product of Shell Petrochemical Co., Ltd.) | 860 parts |
| --- | --- |
| Adipic acid | 195 parts |
| Tetraethylammonium bromide | 2 parts |

The above mixture was placed into a reactor and subjected to dehydration condensation reaction at 130° C. for 8 hours to obtain an epoxy polyester resin (carboxyl group 0.63 mole/kg) having an acid value of 35.5.

Preparation of resin (A-9)

| Dimethyl terephthalate | 155.2 parts |
| --- | --- |
| Trimethylolpropane | 26.8 parts |
| Neopentyl glycol | 83.2 parts |
| Dibutyltin oxide | 1 part |

The above mixture was placed into a reactor and subjected to dealcoholization condensation reaction at 220° C. for 5 hours, giving a polyester resin having an acid value of up to 0.1.

EXAMPLE 1

| Resin (A-1) | 100 parts |
| --- | --- |
| 2-Butoxy ethanol | 100 parts |

The above resin solution was heated to 110° C., and the following mixture was added dropwise to the solution over a period of 3 hours.

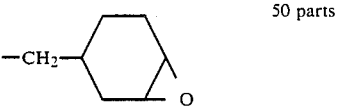
50 parts

| n-Butyl methacrylate | 30 parts |
| --- | --- |
| γ-Acryloxypropylphenylmethoxysilane | 20 parts |
| tert-Butyl peroxioctoate | 5 parts |

The resulting mixture was maintained at the same temperature for 5 hours to obtain a transparent resin solution (1), 67% in solids content and R in Gardner viscosity (25° C.). The solution was sealed off and stored at 30° C. for 3 months but remained stable free of any increase in viscosity, separation or turbidity. A composition of Example 1 was prepared using the resin and the chelate compound given in Table 1 in the listed amounts.

EXAMPLE 2

| Resin (A-2) | 100 parts |
| --- | --- |
| Butyl acetate | 100 parts |

The above resin solution was heated to 100° C., and the following mixture was added dropwise to the solution over a period of 3 hours.

$$CH_2=CH-\overset{CH_3}{\underset{\underset{O}{\|}}{C}}-O-CH_2-\overset{}{\underset{OH}{CH}}-\text{(cyclohexane-epoxide)} \quad 5\ parts$$

| n-Butyl acrylate | 10 parts |
| --- | --- |
| γ-Methacryloxypropyltrimethoxysilane | 5 parts |
| Benzoyl peroxide | 3 parts |

The resulting mixture was maintained at the same temperature for 5 hours to obtain a transparent resin solution (2), 55% in solids content and M in Gardner viscosity (25° C.). The solution was sealed off and stored at 30° C. for 3 months but remained stable free of any increase in viscosity, separation or turbidity. A composition of Example 2 was prepared using the resin and the chelate compound given in Table 1 in the listed amounts.

EXAMPLE 3

| Resin (A-3) | 20 parts |
| --- | --- |
| Xylene | 50 parts |
| Cellosolve acetate | 50 parts |

The above resin solution was heated to 120° C., and the following mixture was added dropwise to the solution over a period of 3 hours.

| Styrene | 60 parts |
| --- | --- |
| $CH_2=CH-\overset{O}{\overset{\|}{C}}-O-CH_2CH_2-O-\text{(dicyclopentadiene-epoxide)}$ | 10 parts |
| $CH_2=CH-\text{(phenyl)}-CH_2CH_2-\underset{\underset{CH_3}{|}}{\overset{\overset{CH_3}{|}}{Si}}-OCH_3$ | 30 parts |
| tert-Butyl perbenzoate | 8 parts |

The resulting mixture was maintained at the same temperature for 5 hours to obtain a transparent resin solution (3), 55% in solids content and U in Gardner viscosity (25° C.). The solution was sealed off and stored at 30° C. for 3 months but remained stable free of any increase in viscosity, separation or turbidity. A composition of Example 3 was prepared using the resin and the chelate compound given in Table 1 in the listed amounts.

EXAMPLE 4

| Resin (A-4) | 50 parts |
| --- | --- |
| 2-Butoxy ethanol | 50 parts |

The above resin solution was heated to 110° C., and the following mixture was added dropwise to the solution over a period of 3 hours.

| | |
|---|---|
| 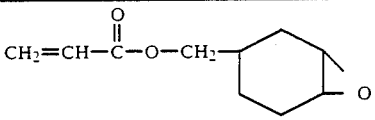 | 25 parts |
| n-Butyl acrylate | 22 parts |
| | 3 parts |
| 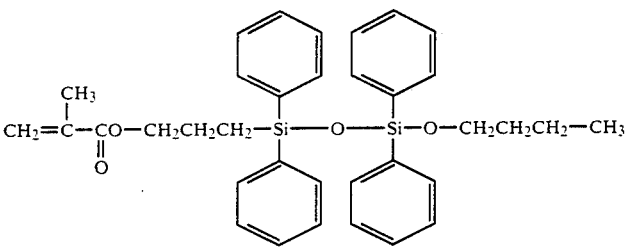 | |
| tert-Butyl peroxibenzoate | 3 parts |

The mixture was maintained at the same temperature for 1 hour. With addition of 2 parts of tert-butyl peroxibenzoate, the mixture was thereafter maintained at the same temperature for 5 hours, giving a transparent resin solution (4), 67% in solids content and U in Gardner viscosity (25° C.). The solution was sealed off and stored at 30° C. for 3 months but remained stable free of any increase in viscosity, separation or turbidity. A composition of Example 4 was prepared using the resin and the chelate compound given in Table 1 in the listed amounts.

EXAMPLE 5

| | |
|---|---|
| Resin (A-1) | 100 parts |
| 2-Butoxy ethanol | 100 parts |

The above resin solution was heated to 110° C., and the following mixture was added dropwise to the solution over a period of 3 hours.

| | |
|---|---|
| Styrene | 50 parts |
| n-Butyl methacrylate | 30 parts |
| γ-Acryloxypropylphenylmethoxysilane | 20 parts |
| tert-Butyl peroxyoctoate | 5 parts |

The resulting mixture was maintained at the same temperature for 5 hours to obtain a resin solution (5), 65.5% in solids content.

Subsequently, a resin solution (6) containing 65.5% of solids was prepared in the same manner as above with the exception of replacing the styrene by

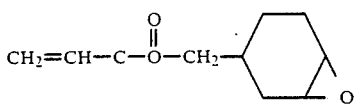

and the γ-acryloxypropylphenyl methoxysilane by n-butyl methacrylate, each in the same corresponding amount as above.

Next, the resin solutions (5) and (6) were mixed together, each in an amount of 50 parts, to obtain a transparent resin solution (7), 66% in solids content and S in Gardner viscosity (25° C.). This solution was sealed off and stored at 30° C. for 3 months but remained stable free of any increase in viscosity, separation or turbidity. A composition of Example 5 was prepared using the resin and the chelate compound given in Table 1 in the listed amounts.

EXAMPLE 6

The chelate compound listed in Table 1 was added in the specified amount to the resin solution (1) obtained in Example 1 to prepare a composition.

COMPARATIVE EXAMPLE 1

A resin solution (8), 67% in solids content and T in Gardner viscosity (25° C.), was prepared in the same manner as in Example 1 except that the resin (A-1) was replaced by the same amount of the resin (A-5). The solution was slightly turbid and separated into two layers in 1 week when sealed off and stored at 30° C., hence poor stability.

COMPARATIVE EXAMPLE 2

A resin solution (9), 50% in solids content, L in Gardner viscosity (25° C.) and 7500 in the number average molecular weight of the resin, was prepared in the same manner as in Example 1 except that 100 parts of the resin (A-1) used in Example 1 was not used. Subsequently, 100 parts of the solution (9) was admixed with 100 parts of the resin (A-1) to obtain a resin solution (10) containing 67% of solid. The solution was turbid and separated into two layers in three days when sealed off and stored at 30° C., hence poor stability.

COMPARATIVE EXAMPLES 3 AND 4

The chelate compound listed in Table 1 was added in the specified proportion to the resin solutions (5) and (6) to obtain compositions of Comparative Examples 3 and 4.

COMPARATIVE EXAMPLE 5

The same resin solution as used in Example 1 was prepared as a composition of this example without adding any chelate compound thereto.

COMPARATIVE EXAMPLE 6

The chelate compound listed in Table 1 was added in the specified proportion to the resin solution (7) to obtain a composition of Comparative Example 6. Table 2 shows the results obtained by testing the compositions of the above Examples and Comparative Examples to evaluate the properties thereof.

TABLE 1

| Example | Resin soln. Kind | Resin soln. Amount* | Chelate compound Kind | Chelate compound Amount* |
|---|---|---|---|---|
| Ex. 1 | (1) | 100 | Diisopropoxy ethylacetylacetate aluminum | 1.0 |
| Ex. 2 | (2) | 100 | Tetrakis(acetylacetonato)zirconium | 1.0 |
| Ex. 3 | (3) | 100 | Tris(ethylacetoacetate)aluminum | 3.0 |
| Ex. 4 | (4) | 100 | Tris(ethylacetoacetate)aluminum | 1.5 |
| Ex. 5 | (7) | 100 | Tris(ethylacetoacetate)aluminum | 0.5 |
| Ex. 6 | (1) | 100 | Tetrakis(acetylacetonato)zirconium | 3.0 |
| Comp. Ex. 1 | (8) | 100 | Diisopropoxy ethylacetoacetate aluminum | 1.0 |
| Comp. Ex. 2 | (10) | 100 | Diisopropoxy ethylacetoacetate aluminum | 1.0 |
| Comp. Ex. 3 | (5) | 100 | Diisopropoxy ethylacetoacetate aluminum | 1.0 |
| Comp. Ex. 4 | (6) | 100 | Diisopropoxy ethylacetoacetate aluminum | 1.0 |
| Comp. Ex. 5 | (1) | 100 | | 0 |
| Comp. Ex. 6 | (9) | 100 | Diisopropoxy ethylacetoacetate aluminum | 1.0 |

*Parts by weight (solids)

TABLE 2

| | Example 1 | Example 2 | Example 3 | Example 4 | Example 5 | Example 6 |
|---|---|---|---|---|---|---|
| Curing condition | 120° C. 30 min. | 120° C. 30 min. | 25° C. 24 hr. | 80° C. 30 min. | 120° C. 30 min. | 40° C. 60 min. |
| Appearance of coating | Good | Good | Good | Good | Good | Good |
| Gel fraction ratio (%) | 99.3 | 98.1 | 95.6 | 97.8 | 98.5 | 94.1 |
| Pencil hardness | 3H | 3H | H | 2H | 2H | H |
| Adhesion | | | | | | |
| Untreated steel panel | 100 | 100 | 100 | 100 | 100 | 100 |
| Zinc phosphate-treated steel panel | 100 | 100 | 100 | 100 | 100 | 100 |
| Untreated copper panel | 100 | 100 | 100 | 100 | 100 | 100 |
| Untreated aluminum panel | 100 | 100 | 100 | 100 | 100 | 100 |

| | Comparative Example 1 | Comparative Example 2 | Comparative Example 3 | Comparative Example 4 | Comparative Example 5 | Comparative Example 6 |
|---|---|---|---|---|---|---|
| Curing condition | 120° C. 30 min. | 120° C. 30 min. | 120° C. 30 min. | 120° C. 30 min. | 120° C. 30 min. | 120° C. 30 min. |
| Appearance of coating | Turbid, poor surface smoothness | Turbid, poor surface smoothness | Shrinkage | Good | Shrinkage | Good |
| Gel fraction ratio (%) | 91.2 | 89.3 | 32.4 | 20.9 | 13.7 | 96.8 |
| Pencil hardness | 2H | H | 2B | 4B | 4B | 2H |
| Adhesion | | | | | | |
| Untreated steel panel | 10 | 30 | 80 | 50 | 80 | 20 |
| Zinc phosphate-steel panel | 100 | 100 | 100 | 100 | 100 | 70 |
| Untreated copper panel | 0 | 10 | 50 | 20 | 50 | 10 |
| Untreated aluminum panel | 30 | 30 | 50 | 50 | 50 | 50 |

Coating Property Tests

The composition of each of Examples and Comparative Examples was applied to substrates to a dry thickness of 100 μ, dried under the condition listed in Table 2 and then tested.

Appearance: The coating was checked for gloss, surface smoothness, shrinkage, cracks, turbidity, etc.

Gel fraction ratio: The dried coating was separated off the substrate (glass) and subjected to extraction with acetone for 6 hours at the reflux temperature using a Soxhlet extractor. The ratio of the resulting residue was expressed in percentage.

Adhesion: The coated substrate panels of different materials were immersed in hot water at a temperature of at least 90° C. for one hour and then immediately cooled with cold water to prepare test panels. The coating on each panel was cut crosswise to form 100 1-mm squares, and a cellophane adhesive tape was affixed to the coating and then peeled off. The adhesion is expressed in terms of the number of squares remaining on the panel without separation.

EXAMPLE 7

| Resin (A-6) | 100 parts |
|---|---|
| 2-Butoxy ethanol | 100 parts |

The above resin solution was heated to 110° C., and the following mixture was added dropwise to the solution over a period of 3 hours.

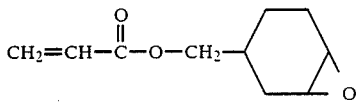  50 parts

| n-Butyl methacrylate | 30 parts |
|---|---|
| γ-Acryloxypropylphenylmethoxysilane | 20 parts |

-continued

| Azobisisobutyronitrile | 5 parts |

The resulting mixture was maintained at the same temperature for 5 hours to obtain a transparent resin solution (11), 67% in solids content and U in Gardner viscosity (25° C.). The solution was sealed off and stored at 30° C. for 3 months but remained stable free of any increase in viscosity, separation or turbidity. A composition of Example 7 was prepared using the resin solution and the chelate compound given in Table 3 in the listed amounts.

EXAMPLE 8

| Resin (A-7) | 40 parts |
| Xylene | 40 parts |
| 2-Ethoxyethyl acetate | 40 parts |

The above resin solution was heated to 120° C., and the following mixture was added dropwise to the solution over a period of 3 hours.

| Styrene | 60 parts |
| $CH_2=CH-\overset{O}{\underset{\parallel}{C}}-O-CH_2CH_2-O-\text{[dicyclopentadienyl epoxide]}$ | 10 parts |
| $CH_2=CH-\text{[phenyl]}-CH_2CH_2-\underset{\underset{CH_3}{\mid}}{\overset{\overset{CH_3}{\mid}}{Si}}-OCH_3$ | 30 parts |
| tert-Butyl perbenzoate | 3 parts |

The mixture was maintained at the same temperature for 1 hour. With addition of 2 parts of tert-butyl perbenzoate, the mixture was thereafter maintained at the same temperature for 3 hours, giving a transparent resin solution (12), 55% in solids content and W in Gardner viscosity (25° C.). The solution was sealed off and stored at 30° C. for 3 months but remained stable free of any increase in viscosity, separation or turbidity. A composition of Example 8 was prepared using the resin solution and the chelate compound given in Table 3 in the listed amounts.

EXAMPLE 9

| Resin (A-8) | 100 parts |
| Butyl acetate | 100 parts |

The above resin solution was heated to 110° C., and a ⅓ portion (by weight) of the following mixture was added to the solution.

| $CH_2=\underset{\underset{O}{\overset{\overset{CH_3}{\mid}}{C}}}{\overset{}{C}}-\underset{\parallel}{C}-O-CH_2-\underset{\underset{OH}{\mid}}{CH}-\text{[cyclohexyl-O]}$ | 5 parts |
| n-Butyl acrylate | 30 parts |
| γ-Methacryloxypropyltrimethoxysilane | 15 parts |

-continued

| Azobisisovaleronitrile | 6 parts |

The mixture was reacted at the same temperature for 30 minutes. The remaining ⅔ portion of the above mixture was added dropwise to the reaction mixture at the same temperature over a period of 2.5 hours. The resulting mixture was maintained for 3 hours to give a transparent resin solution (13), 60% in solids content and Y in Gardner bubble viscosity (25° C.). The solution was sealed off and stored at 30° C. for 3 months but remained stable free of any increase in viscosity, separation or turbidity. A composition of Example 9 was prepared using the resin solution and the chelate compound given in Table 3 in the listed amounts.

EXAMPLE 10

The chelate compound listed in Table 3 was added in the specified proportion to the resin solution (13) to obtain a composition of Example 10.

EXAMPLE 11

The chelate compound listed in Table 3 was added in the specified proportion to the resin solution (11) to obtain a composition of Example 11.

COMPARATIVE EXAMPLE 7

A resin solution (14), 67% in solids content and T in Gardner bubble viscosity (25° C.), was prepared in the same manner as in Example 7 except that the resin (A-6) used in Example 7 was replaced by the same amount of the resin (A-9). The solution was slightly turbid and separated into two layers in 7 days when sealed off and stored at 30° C., hence poor stability. The chelate compound listed in Table 3 was added in the specified proportion to the resin solution to obtain a composition of Comparative Example 7.

COMPARATIVE EXAMPLE 8

2-Butoxy ethanol (100 parts) was heated to 110° C., and the same mixture of monomers and initiator as used in Example 7 was added to the ethanol for reaction to obtain a resin solution (15) in the same manner as in Example 7. The solution was 50% in solids content and L in Gardner bubble viscosity (25° C.). The resin solution (15) (500 parts) was admixed with 100 parts of the resin (A-6) to obtain a resin solution (16) with a solids content of 67%. The solution was turbid and separated into two layers in 3 days when sealed off and stored at 30° C., hence poor stability. The chelate compound listed in Table 3 was added in the specified proportion to the resin solution to obtain a composition of Comparative Example 8.

COMPARATIVE EXAMPLE 9

A resin solution (17), 67% in solids content, was prepared in the same manner as in Example 7 except that the compound

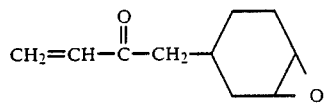

used in Example 7 was replaced by the same amount of styrene. The chelate compound listed in Table 3 was added in the specified proportion to the solution to obtain a composition of Comparative Example 9.

COMPARATIVE EXAMPLE 10

A resin solution (18), 67% in solids content, was prepared in the same manner as in Example 7 except that the γ-acryloxypropylphenylmethoxysilane used in Example 7 was replaced by the same amount of n-butyl methacrylate. The chelate compound listed in Table 3 was added in the specified proportion to the solution to obtain a composition of Comparative Example 10.

COMPARATIVE EXAMPLE 11

The same resin solution as used in Example 7 was prepared as a composition of Comparative Example 11 without adding any chelate compound thereto.

COMPARATIVE EXAMPLE 12

The chelate compound listed in Table 3 was added in the specified proportion to the resin solution (15) to obtain a composition of Comparative Example 12.

The compositions of the above Examples and Comparative Examples were tested for properties. Table 4 shows the results obtained.

TABLE 3

| Example | Resin soln. Kind | Amount* | Chelate compound Kind | Amount* |
|---|---|---|---|---|
| Ex. 7 | (11) | 100 | Diisopropoxy ethyl acetoacetate aluminum | 1.0 |
| Ex. 8 | (12) | 100 | Tetrakis(acetylacetonato)-zirconium | 1.0 |
| Ex. 9 | (13) | 100 | Tris(ethylacetoacetate)-aluminum | 3.0 |
| Ex. 10 | (13) | 100 | Tris(ethylacetoacetate)-aluminum | 1.5 |
| Ex. 11 | (11) | 100 | Tetrakis(acetylacetonato)-zirconium | 3.0 |
| Comp. Ex. 7 | (14) | 100 | Diisopropoxy ethylacetoacetate aluminum | 1.0 |
| Comp. Ex. 8 | (16) | 100 | Diisopropoxy ethylacetoacetate aluminum | 1.0 |
| Comp. Ex. 9 | (17) | 100 | Diisopropoxy ethylacetoacetate aluminum | 1.0 |
| Comp. Ex. 10 | (18) | 100 | Diisopropoxy ethylacetoacetate aluminum | 1.0 |
| Comp. Ex. 11 | (11) | 100 | | 0 |
| Comp. Ex. 12 | (15) | 100 | Diisopropoxy ethylacetoacetate aluminum | 1.0 |

*Parts by weight (solids)

TABLE 4

| | Example | | | | |
|---|---|---|---|---|---|
| | 7 | 8 | 9 | 10 | 11 |
| Curing condition | 120° C. 30 min. | 120° C. 30 min. | 25° C. 24 hr. | 80° C. 30 min. | 40° C. 60 min. |
| Appearance of coating | Good | Good | Good | Good | Good |
| Gel fraction ratio (%) | 98.9 | 98.4 | 93.8 | 97.9 | 93.6 |
| Pencil hardness | 3H | 3H | H | 2H | H |
| Adhesion | | | | | |
| Untreated steel panel | 100 | 100 | 100 | 100 | 100 |
| Zinc phosphatetreated steel panel | 100 | 100 | 100 | 90 | 100 |
| Untreated copper panel | 100 | 100 | 100 | 100 | 100 |
| Untreated aluminum panel | 100 | 100 | 100 | 100 | 100 |
| | Comparative Example | | | | | |
| | 7 | 8 | 9 | 10 | 11 | 12 |
| Curing condition | 120° C. 30 min. | 120° C. 30 min. | 120° C. 30 min. | 120° C. 30 min. | 120° C. 30 min. | 120° C. 30 min. |
| Appearance of coating | Turbid, poor surface smoothness | Turbid, poor surface smoothness | Shrinkage | Good | Shrinkage | Good |
| Gel fraction ratio (%) | 91.2 | 89.3 | 32.4 | 20.9 | 13.7 | 96.8 |
| Pencil hardness | 2H | H | 2B | 4B | 4B | 2H |
| Adhesion | | | | | | |
| Untreated steel panel | 10 | 30 | 80 | 50 | 80 | 20 |
| Zinc phosphate-steel panel | 100 | 100 | 100 | 100 | 100 | 70 |
| Untreated copper panel | 0 | 10 | 50 | 20 | 50 | 10 |
| Untreated aluminum panel | 30 | 30 | 50 | 50 | 50 | 50 |

We claim:
1. A curable resin obtained by subjecting to radical polymerization at least one of an alkoxysilicon-containing vinyl monomer and (b) a polysiloxane macromonomer with (c) an oxirane-containing vinyl monomer in the presence of a polymerization initiator and in the presence of a resin (A) having in the molecule at least one member selected from the group consisting of a carboxyl group and an alicyclic hydrocarbon ring having one or two hydrogen atoms bonded to at least one carbon atom forming the alicyclic hydrocarbon ring, wherein said monomer (a) is a compound represented by the formula

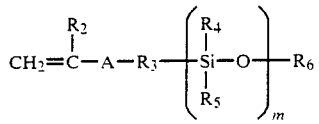

wherein A is

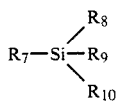

$R_2$ is a hydrogen atom or methyl, $R_3$ is a bivalent aliphatic saturated hydrocarbon group having 1 to 6 carbon atoms, $R_4$ and $R_5$ are the same or different and are each phenyl, alkyl having 1 to 6 carbon atoms or alkoxyl having 1 to 10 carbon atoms, $R_6$ is alkyl having 1 to 10 carbon atoms, and m is an integer of from 1 to 10; and said macromonomer (b) is prepared by subjecting to condensation reaction 70 to 99.999 mole % of a compound ($b^1$) represented by the formula

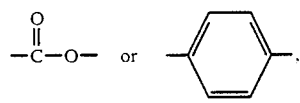 (XIV)

wherein $R_7$ is an aliphatic hydrocarbon group having 1 to 8 carbon atoms or phenyl, and $R_8$, $R_9$ and $R_{10}$ are each alkoxyl having 1 to 4 carbon atoms or hydroxyl with 30 to 0.001 mole % of a compound ($b^2$) represented by the formula

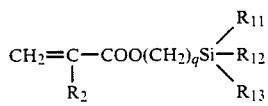 (XV)

wherein $R_2$ is a hydrogen atom or methyl, $R_{11}$, $R_{12}$ and $R_{13}$ are each hydroxyl, alkoxyl having 1 to 4 carbon atoms or an aliphatic hydrocarbon group having 1 to 8 carbon atoms, at least one of $R_{11}$, $R_{12}$ and $R_{13}$ being hydroxyl or alkoxyl, and q is an integer of 1 to 6, the macromonomer having one polymerizable unsaturated bond and at least two members selected from the group consisting of hydroxyl groups and alkoxyl groups at a portion thereof corresponding to the terminal end per molecule on the average, the macromonomer being 400 to 100000 in number average molecular weight.

2. A curable resin as defined in claim 1 wherein the resin (A) is a resin having the alicyclic hydrocarbon ring.

3. A curable resin as defined in claim 2 which the alicyclic hydrocarbon ring-containing resin contains at least about 0.1 mole of the alicyclic hydrocarbon ring per kilogram of the resin.

4. A curable resin as defined in claim 1 wherein the resin (A) is a carboxyl-containing resin.

5. A curable resin as defined in claim 4 which the carboxyl-containing resin contains about 0.05 to about 1 mole of carboxyl group per kilogram of the resin.

6. A curable resin as defined in claim 1 wherein the resin (A) is a resin containing both the alicyclic hydrocarbon ring and carboxyl group.

7. A curable resin as defined in claim 1 wherein the oxirane-containing vinyl monomer is one compound selected from among compounds represented by the respective formulae:

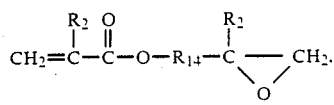

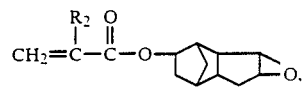

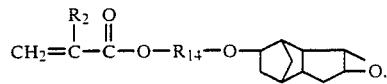

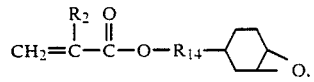

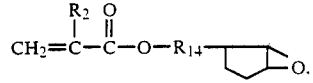

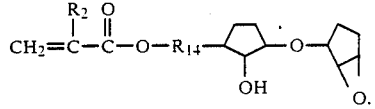

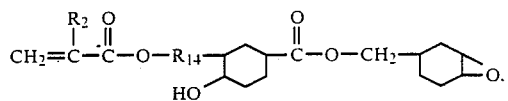

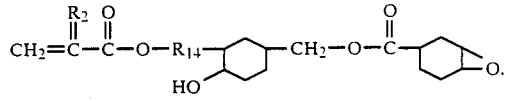

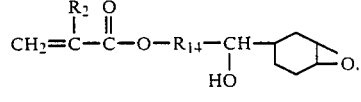

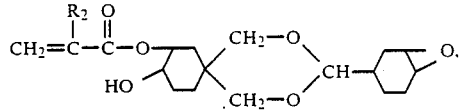

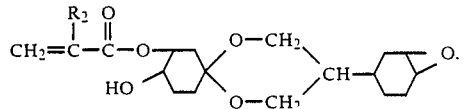

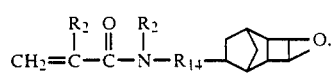

-continued

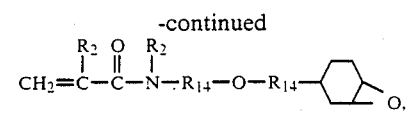

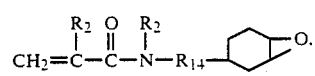

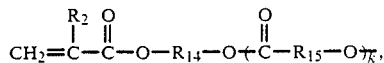

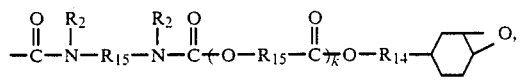

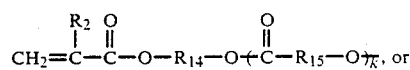

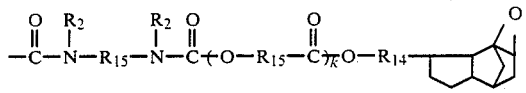

wherein $R_2$ is a hydrogen atom or methyl, $R_{14}$ is a bivalent aliphatic saturated hydrocarbon group having 1 to 6 carbon atoms, $R_{15}$ is a bivalent hydrocarbon group having 1 to 10 carbon atoms, and k is an integer of from 0 to 10.

8. A curable resin which is a mixture of (i) a polymer obtained by subjecting to radical polymerization at least one of (a) an alkoxysilicon-containing vinyl monomer and (b) a polysiloxane macromonomer in the presence of a resin (A) which has in the molecule at least one member selected from the group consisting of a carboxyl group and an alicyclic hydrocarbon ring having one or two hydrogen atoms bonded to at least one carbon atom forming the alicyclic hydrocarbon ring and a polymerization initiator (ii) a polymer obtained by subjecting to radical polymerization (c) an oxirane-containing vinyl monomer in the presence of the resin (A) and a polymerization initiator, wherein said monomer (a) is a compound represented by the formula

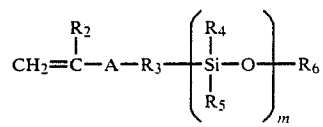

wherein A is

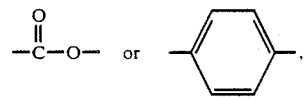

$R_2$ is a hydrogen atom or methyl, $R_3$ is a bivalent aliphatic saturated hydrocarbon group having 1 to 6 carbon atoms, $R_4$ and $R_5$ are the same or different and are each phenyl, alkyl having 1 to 6 carbon atoms or alkoxyl having 1 to 10 carbon atoms, $R_6$ is alkyl having 1 to 10 carbon atoms, and m is an integer of from 1 to 10; and said macromonomer (b) is prepared by subjecting to condensation reaction 70 to 99.999 mole % of a compound ($b^1$) represented by the formula

wherein $R_7$ is an aliphatic hydrocarbon group having 1 to 8 carbon atoms or phenyl, and $R_8$, $R_9$ and $R_{10}$ are each alkoxyl having 1 to 4 carbon atoms or hydroxyl with 30 to 0.001 mole % of a compound ($b^2$) represented by the formula

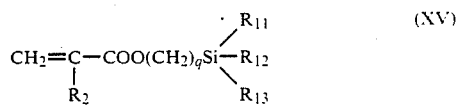

wherein $R_2$ is a hydrogen atom or methyl, $R_{11}$, $R_{12}$ and $R_{13}$ are each hydroxyl, alkoxyl having 1 to 4 carbon atoms or an aliphatic hydrocarbon group having 1 to 8 carbon atoms, at least one of $R_{11}$, $R_{12}$ and $R_{13}$ being hydroxyl or alkoxyl, and q is an integer of 1 to 6, the macromonomer having one polymerizable unsaturated bond and at least two members selected from the group consisting of hydroxyl groups and alkoxyl groups at a portion thereof corresponding to the terminal end per molecule on the average, the macromonomer being 400 to 100000 in number average molecular weight.

9. A resin composition curable at a low temperature comprising the curable resin defined in claim 1 and a metal chelate compound capable of acting as a curing agent.

10. A resin composition as defined in claim 9 wherein the metal chelate compound is an aluminum chelate compound.

11. A resin composition as defined in claim 9 wherein the metal chelate compound is a titanium chelate compound.

12. A resin composition as defined in claim 9 wherein the metal chelate compound is a zirconium chelate compound.

13. A resin composition as defined in claim 9 which comprises 0.01 to 30 parts by weight of the metal chelate compound per 100 parts by weight of the curable resin.

14. A resin composition curable at a low temperature comprising the curable resin as defined in claim 8 and a metal chelate compound capable of acting as a curing agent.

* * * * *